Jan. 21, 1964 W. R. OSBAN ETAL 3,118,154
METHOD FOR THE FLUID TREATMENT OF STRANDS OF ELONGATED MATERIAL
Filed March 1, 1961
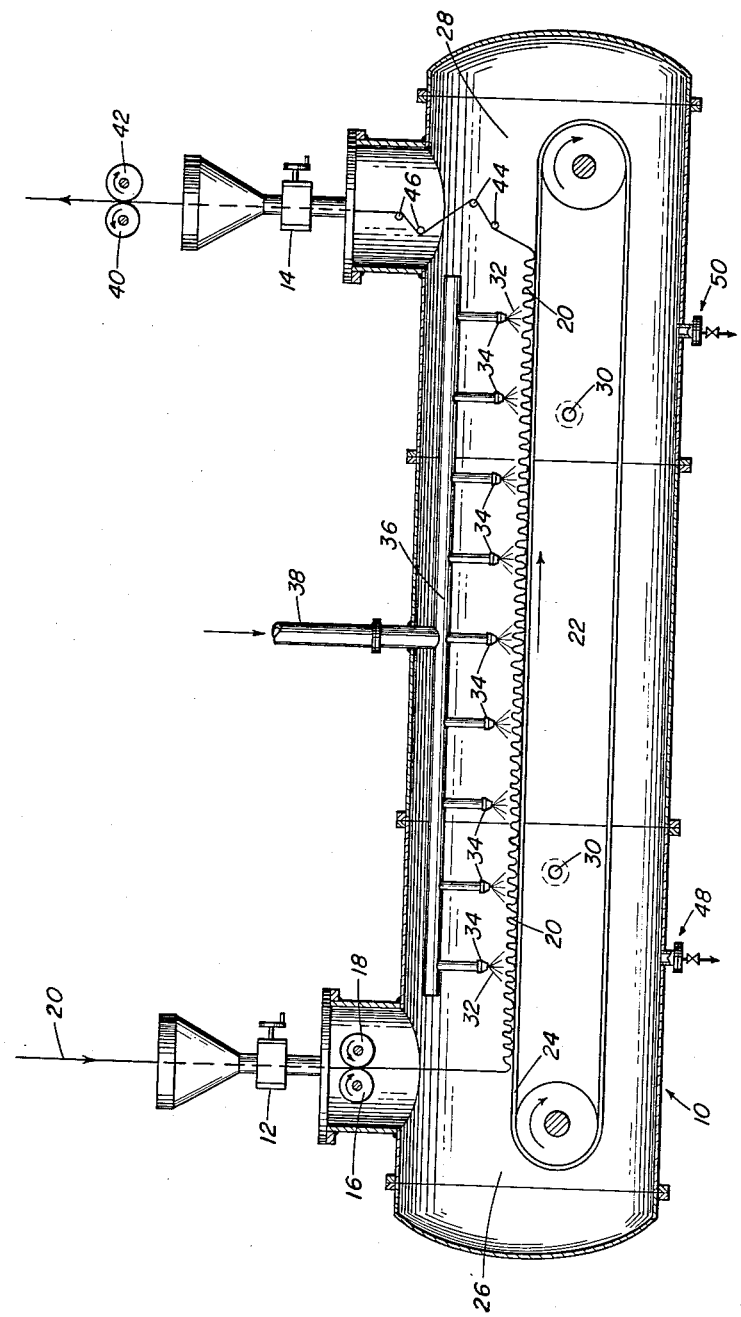
INVENTORS.
WILLIAM R. OSBAN
ALEXANDER J. CARMAN
BY
Harold L. Kauffman
ATTORNEY

United States Patent Office 3,118,154
Patented Jan. 21, 1964

3,118,154
METHOD FOR THE FLUID TREATMENT OF STRANDS OF ELONGATED MATERIAL
William R. Osban, Gulf Breeze, and Alexander J. Carman, Pensacola, Fla., assignors to American Cyanamid Company, New York, N.Y., a corporation of Maine
Filed Mar. 1, 1961, Ser. No. 92,649
2 Claims. (Cl. 8—149.1)

This invention relates broadly to certain new and useful improvements in a method for the fluid treatment of elongated material, especially strands of such material. More particularly it is concerned with a new and improved method for treating natural and synthetic monofilaments and multifilaments with fluid media during their travel from one point to another, and specifically those which must be treated in a heated and/or saturated atmosphere where cycle time is economically important. Examples of such filamentary materials are those made from fiber-formable, thermoplastic homopolymers and copolymers of both the condenastion- and addition-polymerization types, including those wherein the usual processing technique involves treating the filaments at temperatures above 212° F. to relax or shrink them, or for any other purpose.

The present invention relates particularly to certain new and useful improvements in a continuous method of producing polyacrylonitrile filamentary material, specifically a tow or a continuous filamentary yarn comprised of a fiber-formable polymer of acrylonitrile. Such a polyacrylonitrile filamentary material may be comprised of as little as, for example, 35% by weight of a polymer of acrylonitrile. Advantageously the polyacrylonitrile filamentary material is comprised of a polymer of acrylonitrile containing a major proportion of (preferably at least 70%), by weight, acrylonitrile combined in the polymer molecule. The acrylonitrile polymer may be a homopolymer or a copolymer of acrylonitrile, or it may be a blend in which the filamentary material is produced from a blend of two different polymers, the acrylonitrile content of which is at least 70% by weight of combined acrylonitrile.

The terms "strand," "strands," "structure" and "structures" as used generically herein (including the claims in the case of "strand" and "strands") are intended to include within their meaning elongated materials in any form, including monofilaments and multifilaments in yarn, thread, fabric, rod, tape, ribbon, strand, rope, bundle, tow, or other form, and which are of continuous (i.e., indefinite) length.

It was known prior to the present invention that polymeric acrylonitrile strands or structures which do not fibrillate, or which fibrillate only to a negligible degree, can be produced by subjecting a filamentary material or other structure comprised of a polymer of acrylonitrile to a relatively high temperature and pressure in the presence of saturated or wet steam. The known prior art is disclosed in, for example, U.S. Patent No. 2,708,843, dated May 24, 1955, and in the art referred to therein. As is stated in the specification of this patent (column 1, line 44, through column 2, line 15):

"Various and sundry types of apparatus are presently employed for treatment of strand material with liquids or vapors, either cold or hot, and in particular heated vapors under pressure. For example, there are many different types of drying chambers through which the strand is passed while following a complex course and into which heated air or other gas is introduced at the same time. When it is desired to condition the strands, they may be subjected to steam in a similar apparatus. In all such apparatus, where the fluid medium is under high pressure, damage to the strand at the ports of entry and exit often results because of irregular escape of the fluid media therefrom, which causes abrasion of the strand.

"For example, it is the practice to treat synthetic or artificial strands with steam for the purpose of facilitating the stretching of the strands or to cause the strands to shrink. Conventional apparatus employed for this purpose comprises an inclosure containing an atmosphere of steam into which the strands are introduced and then withdrawn through suitable openings in the inclosure. The openings through which the strand passes are made as small as possible to minimize the escape of steam, but because of their small size are likely to subject the strand to abrasion. There is a pressure drop across the openings and the escaping steam exerts a frictional effect on the strand passing through the openings, which sets up a tension in the strand in addition to the tension exerted by any mechanical stretching devices. The tension due to this pressure drop adversely affects the strand, often resulting in chafing or breaking thereof, especially at the entrance opening when the flow of steam from the inclosure is countercurrent to the direction of travel of the strand . . ."

Other prior art includes U.S. Patent No. 2,932,183, dated April 12, 1960. The invention itself is concerned primarily with a pressurized sealing device for eliminating leakage from a pressurized chamber in the interior of which a heat-treating or annealing operation is carried out on a continuously moving tow of synthetic material, specifically a polyacrylonitrile filamentary material.

The advantages of an annealing treatment of a tow of polyacrylonitrile or other synthetic filamentary material are disclosed in, for example, the copending application of Mario Sonnino, Serial No. 25,782, filed April 29, 1960, and in the copending application of Yoshimasa Fujita, Takeshi Okazaki and Keijiro Kuratani, Serial No. 25,783, also filed April 29, 1960, now abandoned in favor of copending application Serial No. 50,440, filed August 18, 1960, as a continuation-in-part of said application Serial No. 25,783. These copending applications are assigned to the same assignee as that of the present invention.

In continuously heat-treating polyacrylonitrile and other thermoplastic filamentary materials under superatmospheric pressure in the prior-art apparatus to improve its useful properties, the time required for the treatment is often so long that certain properties of the material, particularly color, are adversely affected, thereby decreasing its market value. The prior-art apparatus as normally operated also often failed to provide a uniform treatment, so that products were obtained with non-uniform properties such, for example, as in dye-receptivity, resistance to fibrillation and others. The remarks just made apply particularly to polyacrylonitrile and other thermoplastic strands which are continuously heated in an atmosphere of saturated or dry steam.

It is a primary object of the present invention to provide an improved method for treating continuously moving strands of elongated material with a hot, fluid medium comprising steam under superatmospheric pressure in a pressure vessel, whereby the residence time of said strands in said vessel can be decreased without adversely affecting the results sought to be obtained by the treatment.

Another object of the invention is to provide a method of the kind described in the preceding paragraph and whereby a more uniform treatment of continuously moving strands of elongated material, specifically polyacrylonitrile filaments, with a hot, fluid medium comprising steam can be applied and thereby obtain a treated material having more uniform properties.

Other objects of the invention will be apparent to those skilled in the art from the following more detailed description and the accompanying drawing.

The novel features of the invention are set forth in the appended claims. The invention itself, however, will be understood most readily from the following detailed description thereof when considered in connection with the accompanying drawing, which is illustrative of the invention, and in which:

The single figure is a side view, partly in section and partly in elevation, of apparatus that can be used in practicing the invention and illustrative thereof.

Taking a tow of a polyacrylonitrile filamentary material which is capable of shrinking as illustrative of a strand of an elongated material to which the present invention is particularly applicable, it is mentioned that one method of shrinking or relaxing such as tow and otherwise improving its useful properties is first to deposit it in a relaxed state on a continuously moving conveyor. The tow is then carried on the conveyor through a zone of wet or saturated steam under superatmospheric pressure and at a temperature above 100° C. The tow is maintained in this zone of steam for a sufficient period to reach equilibrium conditions. The longer this steaming period, the higher the production cost per unit of tow since it often necessitates a slowdown of prior steps in the process and, additionally, results in higher steam costs per unit of treated tow. Also, the longer this steaming period, the greater is the detrimental effect of the treatment upon the color of the polyacrylonitrile filaments. Hence, anything that can be done to decrease the residence time in the steam-treatment zone is economically advantageous and results in obtaining a treated product having better color and improved marketability.

The present invention provides an economical and unobvious solution to the foregoing problem whereby the aforementioned residence time is decreased without detrimental effects such, for example, as disarrangement of the filaments or causing tension on the filaments during the treatment.

The invention is based on our discovery that the time required to reach equilibrium in a steam-treating operation of the kind above described can be materially decreased, e.g., from periods of the order of 3 or 4 minutes to those of the order of 30 or 40 seconds, by causing a positive flow of preheated liquid, more particularly a preheated aqueous liquid, and specifically preheated liquid water, to pass over and through the strands of elongated material being treated, e.g., a tow of oriented polyacrylonitrile filaments, while the elongated material is concurrently being exposed to the action of a hot fluid medium comprising steam under super-atmospheric pressure.

The foregoing results were quite surprising and unexpected, since in no way could it have been predicted that the application of preheated liquid to a continuously moving elongated material would decrease the residence time in a pressure zone wherein the said material was simultaneously being treated with a hot fluid medium comprising steam. It is believed that the residence time heretofore required to reach equilibrium and to attain the desired objective is shortened because of the more rapid transfer of heat to the elongated material than can be obtained by the use of a steam atmosphere alone.

From the foregoing description it will be seen that method features of the present invention are directed to a certain improvement in a continuous method of treating continuously moving strands of elongated material with a hot fluid medium comprising steam (advantageously saturated steam) under superatmospheric pressure; and that, in practicing the method of the invention, the transfer of heat from the hot fluid medium comprising steam to the elongated material is facilitated. The invention is especially concerned with such an improvement in a continuous method wherein the elongated material is a continuously moving, supported tow of polyacrylonitrile, more particularly oriented polyacrylonitrile filamentary material; and the hot fluid medium comprising steam is at a temperature within the range of from about 105° C. to about 155° C., more particularly within the range of from about 115° C. to about 140° C.

Our invention provides the improvement in the aforementioned process which consists in passing a supported bundle or tow of polyacrylonitrile filamentary material in a relaxed (free-to-shrink) state through a pressure zone containing a hot fluid medium comprising steam within the aforesaid temperature ranges; applying directly to the said supported tow, during its passage through the said pressure zone, a preheated aqueous liquid, specifically preheated liquid water, without appreciably disarranging the said tow; and continuously removing the treated tow from the said pressure zone.

Our invention also provides a continuous method of treating a supported tow of oriented, polyacrylonitrile, filamentary material which comprises continuously subjecting said tow, under superatmospheric pressure in a pressure zone, to the action of a hot, fluid medium comprising steam at a temperature within the range of from about 105° C. to about 155° C., more particularly about 115° C. to about 140° C.; and decreasing the residence time in said pressure zone that otherwise is required to improve useful properties of said tow by spraying preheated liquid water directly upon the tow without appreciably disarranging it, said spraying being effected while the tow is continunously passing through said pressure zone and is simultaneously being subjected to the action of the said hot, fluid medium.

In any of the above-described embodiments of the method features of the invention the preheated liquid, more particularly preheated aqueous liquid, and specifically preheated water, that is applied (as by spraying, for example) to the strands of elongated material, more particularly a tow of polyacrylonitrile filamentary material, is at a temperature which is approximately the same temperature as that of the hot fluid medium comprising steam. By "approximately" the same temperature it is meant that the preheated liquid is either the same (within normal errors in measuring devices) as that of the hot fluid medium comprising steam, or that the preheated liquid is at a temperature which is slightly above (e.g., about ½° C. to about 6° C. above) that of the said hot fluid medium. We prefer to follow the latter practice. To be more specific and with temperature measurements in ° F., when the hot fluid medium comprising steam is at 258° F.±2° F., it may be stated that good results have been obtained with specific tows of polyacrylonitrile filamentary material when the preheated liquid, specifically preheated liquid water, is at a temperature of 261° F.

One of the most unexpected results flowing from the present invention is the fact that one can use a hot fluid medium comprising steam at a somewhat lower temperature than when only said fluid medium is used. For instance, in a particular treatment of a tow of polyacrylonitrile filamentary material it was necessary to use said fluid medium at a temperature of 262° F.±2° F. in order to obtain the desired end result. However, we have surprisingly found that by practicing our invention one can use the hot fluid medium comprising steam at a temperature of 258° F.±2° F. and still obtain the same desired end result. Furthermore, this same end result is obtained in only a fraction of the time, for example about ⅙ to ⅕ of the time, previously required when using only the hot fluid medium comprising steam.

Referring to the single figure of the accompanying drawing, there is shown by way of illustration a pressure vessel 10 having tow inlet-sealing means 12 and tow outlet-sealing means 14. Such inlet- and outlet-sealing means are not a part of the present invention and, for the purpose of the instant invention, may be any of those known in the prior art including those disclosed in the aforementioned Patents 2,708,843 and 2,920,934. From the feed-in rolls 16 and 18 driven by any suitable driving means (not shown) a tow 20 of polyacrylonitrile filamentary material from a supply source (not shown but which is usually a prior step in the process) passes into the main body portion 22 of the vessel 10. By means of suitable plaiting means such as plaiting rolls (not shown) the tow is laid, e.g., transversely, upon the endless, open-mesh conveyor 24, which carries the tow from the strand-inlet end 26 to the strand-outlet end 28 of the pressure vessel 10.

In the pressure vessel 10 the tow is treated, while it is being conveyed in a relaxed state on the endless conveyor 24, with a hot fluid medium comprising saturated steam at a temperature within the range of from about 105° C. to about 155° C., preferably within the range of from about 115° C. to about 140° C. Saturated steam under a pressure sufficient to provide the aforementioned temperature is introduced into the pressure vessel 10 through a plurality of steam inlets, two of which are shown at 30.

The tow is also treated in the pressure vessel 10, while it is being supported and conveyed on the liquid-permeable conveyor 24, with a preheated liquid, specifically preheated liquid water 32, which is sprayed directly upon the continuously moving tow by means of a plurality of sprays or nozzles 34 attached to the spray header 36. The preheated liquid water under suitable superatmospheric pressure (e.g., 30 to 60 lbs./sq. in. gauge) enters the header 36 through the conduit 38 from a suitable supply source (not shown).

The sprays 34 are in such number, of such shape, with openings of such size, and so arranged with respect to each other and to the continuously moving, supported tow passing below them that substantially all exposed portions of the tow receive the sprayed liquid, which is applied in insufficient quantity or force to disarrange it. A delicate balance between these and other influencing factors (including the pressure of the preheated liquid before being ejected through the spray openings) is required. Also the distance of the sprays from the continuously moving tow is important. The total denier of the tow as well as the denier of the individual filaments also must be taken into consideration. Thin tows or bundles of filaments require less intense treatment than thick ones, and vice versa. Sprays with openings that are too large in size and/or the ejection of the preheated water through the sprays under too high a pressure causes or tends to cause undesirable disarrangement of the filaments. On the other hand, sprays with openings that are too small in size may lead to plugging of the said openings.

It is important that the various influencing factors wherein the use of sprays is involved, which factors include the number of sprays, their arrangement with respect to each other, and the total amount of preheated liquid applied to any particular area of tow in a particular time be such that the tow is not covered with any substantial quantity of said liquid. The influencing factors that have a bearing on the amount of liquid on the tow at a given instant also include the construction of the conveying surface. In other words, the latter should be of porous, sieve, sieve-like, open-mesh or other liquid-permeable construction or nature so that the preheated liquid water applied by the sprays to the tow can drain rapidly from the conveyor after it has penetrated and passed through the tow being carried by the conveyor.

From the foregoing discussion it is believed to be clear that it is impossible to be precise on exact features of construction and arrangement of the sprays, their number, operating conditions, etc., or on the construction and operation of the conveyor due to the many influencing factors involved and the further fact that they are dependent upon the particular material being treated and the purpose of this treatment.

When the tow approaches the end of the conveyor it is removed therefrom and withdrawn from the pressure vessel 10 by means of the take-out rolls 40 and 42, after passing over the guide rods 44, the guide rods 46 and through the tow-outlet sealing means 14. Rolls 40 and 42 are driven by any suitable means (not shown).

Suitable drain-off means are provided for draining condensed steam and excess liquid (passing through the open-mesh conveyor 24) from the pressure vessel 10. Such means may take the form indicated at 48 and 50.

In a typical operation whereby the method of the invention is carried out, a tow of oriented polyacrylonitrile filamentary material capable of being shrunk (e.g., a total of between about 45% and about 30%), specifically one made from a copolymer, more particularly a ternary polymer, of copolymerizable ingredients including, by weight, about 85% acrylonitrile, about 7.5% vinyl acetate and about 7.5% 2-methyl-5-vinylpyridine, having a total tow denier of about 450,000 and a denier of the individual filaments averaging about 3, is introduced into the pressure vessel 10 in the manner hereinabove described. The tow is plaited on the endless, open-mesh conveyor 24 and is passed through the pressure vessel 10 at a rate such that the time that any given point on this tow is within the said vessel is about 35 seconds. The rate of travel of the conveyor 24 is less than that of the tow being laid upon it in order to assure the necessary lack of tension and to allow the tow to shrink without hindrance. The tow may be laid upon the conveyor at a rate of, for example, about 75 meters per minute (400 pounds per hour).

Saturated steam is introduced into the vessel 10 through suitable steam inlets, including those shown at 30, under a pressure such that the average temperature is 258° F.±2° F. Preheated water under superatmospheric pressure and at a temperature of 261° F. is applied to the supported continuously moving tow through the sprays 34 at the rate of 27±5 gals. per min.

When the same procedure is applied to the same denier and composition of tow in the absence of the sprays, that is, without the application of the preheated liquid water, a residence time of from 2.9 to 3.1 minutes is required and the use of a steam temperature of 262° F.±2° F.

In both cases the original shrinkage remaining in the treated tow ranges between about 0% and about 3%. However, treating tows wherein the fiber yellowness value normally ranges between 0.12 and 0.17 (that is, in the absence of sprays), the technique of the present invention provides treated tows of oriented, polyacrylonitrile filaments that are materially better in color (e.g., fiber yellowness values that are between about 0.02 and about 0.03 lower than values in the aforementioned range of 0.12–0.17). Furthermore, by means of the present invention more uniform heat-relaxation (i.e., more uniform residual shrinkage) of the tow is obtained, as well as more uniform properties of the fiber in its dye-receptivity, wet and dry tensile strengths, fibrillation resistance and in its other physical characteristics.

It will be understood, of course, by those skilled in the art that our invention is not limited to the processing of a tow of a polyacrylonitrile filamentary material of the kind described in the preceding paragraphs. Thus, instead of using such a tow of filamentary material we may use a tow of filamentary material comprised of a homopolymer of acrylonitrile or a copolymer of about 90% by weight of acrylonitrile and about 10% by weight of methyl acrylate or of methyl methacrylate. Other acrylonitrile copolymers (thermoplastic, fiber-formable copolymers) of which the tow may be composed or comprised are acrylonitrile copolymers containing in the polymer molecules an average of, for example, at least about 35%, preferably at least about 70%, by weight of combined acrylonitrile. Taking as an example the expression "an acrylonitrile polymer containing in the polymer molecules an average of at least about 35% by weight of combined acrylonitrile," this means herein a polymerization product (homopolymer, copolymer or graft polymer or mixtures thereof) containing in the molecules thereof an average of at least about 35% by weight of the acrylonitrile unit, which is considered to be present in the individual polymer molecule as the group

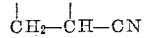

or, otherwise stated, at least about 35% by weight of the reactant substance converted into and forming the polymerization product is acrylonitrile. The expression "an acrylonitrile polymer containing in the polymer molecules an average of at least 70% by weight of combined acrylonitrile" has a similar meaning herein.

Illustrative examples of monomers which may be copolymerized with acrylonitrile to yield a polymerization product containing in the polymer molecules an average of at least 35%, preferably at least about 70%, by weight of combined acrylonitrile are compounds containing a single $CH_2=<$ grouping, for instance, the vinyl esters and especially the vinyl esters of saturated aliphatic monocarboxylic acids, e.g., vinyl acetate, vinyl propionate, vinyl butyrate, etc.; vinyl halides, e.g., the vinyl chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids, e.g., methacrylic, ethacrylic, etc.) and esters and amides of such acids (e.g., ethyl, propyl, butyl, etc., acrylates and methacrylates; acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single $CH_2=C<$ grouping which are copolymerizable with acrylonitrile to yield thermoplastic, fiber-formable copolymers. Alkyl esters of alpha-beta-unsaturated polycarboxylic acids also may be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight) of the polyacrylonitriles (homopolymeric or copolymeric acrylonitriles) used in making the tow of filaments is within the range of 25,000 or 30,000 to 200,000 or 300,000 or higher, and advantageously is of the order of 50,000 to 100,000, e.g., about 65,000 to 75,000, as calculated from a viscosity measurement of the said polymerization product in dimethylformamide using the Staudinger equation (reference: U.S. Patent No. 2,404,713).

The tow of polyacrylonitrile filamentary material may be produced from an acrylonitrile polymerization product by any suitable method and using any suitable apparatus, but advantageously is produced as is described in, for instance, Sonnino Patent No. 2,849,751, dated September 2, 1958.

The present invention is applicable to the treatment of various kinds of strands, among which may be mentioned strands of cotton, wool, flax, hemp, silk and other natural filamentary materials, and the various synthetic filamentary materials including regenerated cellulose such as the various rayons (including cuprammonium cellulose), cellulose ethers and esters, among which may be specifically mentioned ethyl cellulose, hydroxy-ethyl cellulose, etc., cellulose acetate, cellulose nitrate, cellulose butyrate, cellulose acetate butyrate, cellulose propionate butyrate, the various mixed cellulose esters and ethers, and the various vinyl resins including the various polyacrylonitriles of which numerous examples hereinbefore have been given. Additional examples of synthetic filamentary materials to which the present invention is applicable include those strands made from polyethylene, polypropylene and other polyolefins, the various polyvinyl halides including polyvinyl chloride, polyvinyl fluoride, etc., copolymers of vinyl chloride with, for example, vinyl acetate or acrylonitrile, after-chlorinated polymers, e.g., after-chlorinated vinyl and vinylidene homopolymers and copolymers, also homopolymeric and copolymeric vinylidene halides including the chlorides and fluorides, and the various condensation polymers including the various polyesters, polyamides, polyanhydrides, etc.

If desired, strands of elongated material that are treated in accordance with the present invention may be cooled within the vessel before withdrawing them from the vessel. This may be done, for example, as is described and broadly and specifically claimed in the copending application of Richard W. Leins and William R. Osban, Serial No. 38,326, filed June 23, 1960, which application is assigned to the same assignee as that of the present invention.

Various modifications of the present invention can be made without departing from the spirit and scope of the invention. Such modifications include, but are not limited to, means other than sprays for applying the preheated liquid to the strand of elongated material being treated, for example, overflow weirs of orifices, perforated drums or rolls, and others that will be obvious to those skilled in the art. The preheated liquid (or at least part of the total amount required) also might be added simultaneously with the introduction of the strand to be treated to the treating vessel and/or plaiting or otherwise depositing said strand on a conveyor or other means employed for transporting it through a pressure vessel wherein it is treated with a hot fluid medium comprising a gas, specifically steam, under superatmospheric pressure.

We claim:
1. A method for treating continuously moving strands of elongated material with a hot, fluid medium comprising steam, said method comprising passing said strands through a zone containing said hot, fluid medium while said strands are supported on a moving, liquid-permeable support while concurrently causing a positive flow of preheated liquid to pass over and through said strands and said liquid-permeable support thereby facilitating the transfer of heat from the hot, fluid medium comprising steam to the strands of elongated material.

2. A method for treating continuously moving strands of elongated material with a hot, fluid medium comprising steam, said method comprising passing said strands through a zone containing said hot, fluid medium while said strands are supported on a moving support while concurrently causing a positive flow of preheated liquid to pass over and penetrate through said strands thereby facilitating the transfer of heat from the hot, fluid medium comprising steam to the strands of elongated material.

References Cited in the file of this patent
UNITED STATES PATENTS

| | | |
|---|---|---|
| 761,107 | Muntadas | May 31, 1904 |
| 1,497,075 | Elliott | June 10, 1924 |
| 1,907,429 | Masland | May 9, 1933 |
| 2,398,856 | Reel | Apr. 23, 1946 |
| 2,590,850 | Dungler | Apr. 1, 1952 |
| 2,628,884 | Jacoby | Feb. 17, 1953 |
| 2,736,632 | Blau | Feb. 28, 1956 |
| 2,920,934 | Schaefer | Jan. 12, 1960 |
| 2,985,502 | Kronsbein et al. | May 23, 1961 |
| 3,022,926 | Bailey | Feb. 27, 1962 |
| 3,027,740 | Sonnino | Apr. 3, 1962 |
| 3,041,863 | Asahiko Goto | July 3, 1962 |